United States Patent
Murasaki

(10) Patent No.: US 9,517,926 B2
(45) Date of Patent: Dec. 13, 2016

(54) COVER-MATERIAL FASTENING CORD

(75) Inventor: Ryuichi Murasaki, Tokyo (JP)

(73) Assignee: YKK Corporation (JP)

(*) Notice: Subject to any disclaimer, the term of this patent is extended or adjusted under 35 U.S.C. 154(b) by 211 days.

(21) Appl. No.: 14/356,902

(22) PCT Filed: Nov. 9, 2011

(86) PCT No.: PCT/JP2011/075840
§ 371 (c)(1),
(2), (4) Date: May 8, 2014

(87) PCT Pub. No.: WO2013/069114
PCT Pub. Date: May 16, 2013

(65) Prior Publication Data
US 2014/0352117 A1    Dec. 4, 2014

(51) Int. Cl.
B68G 7/12 (2006.01)
A47C 31/02 (2006.01)
B60N 2/58 (2006.01)
F16B 2/20 (2006.01)

(52) U.S. Cl.
CPC .............. B68G 7/12 (2013.01); *A47C 31/023* (2013.01); *B60N 2/5825* (2013.01); *F16B 2/20* (2013.01); *Y10T 24/45105* (2015.01)

(58) Field of Classification Search
CPC ......... A47C 31/02; A47C 27/12; B68G 7/052; B68G 7/12; B60N 2/5825; B60N 2/58; B60N 2/5816; Y10T 24/45105; A44B 19/02; A44B 19/403; A44B 19/40; A44B 19/24; A44B 19/06; A44B 19/04; F16B 2/20

USPC ......................................................... 24/403
See application file for complete search history.

(56) References Cited

U.S. PATENT DOCUMENTS 2,060,830 A * 11/1936 Silberman ............ A44B 19/403
24/413
2,849,774 A * 9/1958 Ryser ..................... A44B 19/06
24/412
5,733,001 A * 3/1998 Roberts ................ B60N 2/5825
24/297

(Continued)

FOREIGN PATENT DOCUMENTS

EP    0359643 A1    3/1990
EP    1769967 A1    4/2007

(Continued)

OTHER PUBLICATIONS

International Preliminary Report on Patentability, PCT Application No. PCT/JP2011/075840, mailed May 13, 2014.

(Continued)

*Primary Examiner* — Jack W Lavinder
(74) *Attorney, Agent, or Firm* — Kilpatrick Townsend & Stockton LLP

(57) ABSTRACT

A cover material fastening cord for fastening a cover material to a cushion material via a clip includes: an elongated tape portion whose first rim is connected to the cover material and whose second rim is connected to the clip; a plurality of block portions that are provided on a surface of the tape portion and has a thickness capable of being held by the clip in a thickness direction of the tape portion; and a flexible joint portion provided on the surface of the tape portion, the joint portion connecting adjacent ones of the block portions.

5 Claims, 20 Drawing Sheets

(56) References Cited

U.S. PATENT DOCUMENTS

2003/0151280 A1* 8/2003 Hashiguchi .......... B60N 2/5825
                                                297/218.1
2007/0137006 A1* 6/2007 Mikuma ................ A44B 19/04
                                                24/403

FOREIGN PATENT DOCUMENTS

| FR | 2899531 A1 | 10/2007 |
| JP | 2001-70106 A | 3/2001 |
| JP | 2006-122594 A | 5/2006 |
| JP | 2009-148407 A | 7/2009 |
| JP | 3163446 U | 10/2010 |

OTHER PUBLICATIONS

International Search Report, PCT Application No. PCT/JP2011/075840, mailed Dec. 13, 2011.
Supplementary European Search Report, European Patent Application No. 11875331.8, mailed Jun. 29, 2015.

* cited by examiner

COVER-MATERIAL FASTENING CORD

This application is a national stage application of PCT/JP2011/075840, which is incorporated herein by reference.

TECHNICAL FIELD

The present invention relates to a cover material fastening cord used for fastening a cover material covering a surface of a chair, a seat or the like.

BACKGROUND ART

Conventionally, a chair used indoors, a seat of a vehicle or the like is often provided with a cushion material or a soft pad whose surface is covered with a cover material at a part to be in contact with a human body (e.g. a seat surface and backrest). Various mechanisms are used for fixing such a cover material.

Among the mechanisms, in an arrangement known from Patent Literature 1, an intermediate part of the cover material is fixed while the fixed part is exteriorly concealed.

In this arrangement, a wire is disposed in a groove provided in the cushion material and an engaging rim extending along the wire is formed at a backside of the cover material. A plurality of clips are arranged along the engaging rim and the clips are sequentially engaged with the wire to fasten the cover material at the backside.

The engaging rim is provided by attaching an elongated fastening cord at the backside of the cover material. The fastening cord includes a tape portion to be sewn to the cover material and an engaging portion bulged in a thickness direction of the tape portion and extending along a rim of the tape portion opposite the cover material. The clips are attached to the engaging portion.

Each of the clips includes a reverse-claw shaped hook to be engaged with the wire and a chuck for holding the engaging portion of the fastening cord at a side opposite to the hook. The engaging portion of the fastening cord is held by the chuck so that each of the clips is attached to the fastening cord and the cover material.

It should be noted that the tape portion of the above-described fastening cord is provided by an elongated component of a predetermined width made of a synthetic resin fiber or an unwoven fabric.

Further, the engaging portion is provided by a bulging portion made of a synthetic resin consecutively formed at a rim of the tape portion. The engaging portion has a wedge-shaped cross section in order to be easily introduced into the clip.

CITATION LIST

Patent Literature(s)

Patent Literature 1: JP-A-2006-122594

SUMMARY OF THE INVENTION

Problem(s) to be Solved by the Invention

A fastened portion of the chair, seat or the like on which the cover material is fastened using the above-described fastening cord is sometimes arranged to draw a curve. In order to be applicable to the curved fastened portion, the fastening cord is required to be bendable (or flexible) to some degree.

On the other hand, the clips engaged with the wire are intermittently disposed and a load is concentrated at the parts at which the clips are disposed. When the fastening cord is soft, the parts of the cover material at which the clips are disposed may be ruffled. In order to avoid the ruffling, it is preferable to provide the fastening cord with some rigidity to dissipate the load concentrated on the clips.

As described above, the fastening cord is required to meet contradictory requirements of flexibility to a curved design and rigidity against the load applied on the clips.

However, the engaging portion formed at a rim of the tape portion of the known fastening cord is provided by a consecutive synthetic resin material and the flexibility and the rigidity are balanced only by adjusting the properties of the resin material. Accordingly, both of the flexibility and the rigidity are not sufficient and a so-called dimple is sometimes generated on the cover material, whereas the fastening cord is not easily applied for providing a sharp curve.

An object of the invention is to provide a cover material fastening cord that is applicable to a sharp curve design and is adapted to avoid an influence on a cover material by the fastening cord.

Means for Solving the Problem(s)

A cover material fastening cord according to an aspect of the invention is for fastening a cover material to a cushion material, the cover material fastening cord including: an elongated tape portion whose first rim is connected to the cover material; a plurality of block portions that are provided on a surface of the tape portion and project in a thickness direction of the tape portion; and a flexible joint portion provided on the surface of the tape portion between the block portions, the joint portion connecting adjacent ones of the block portions.

According to the above aspect of the invention, the cover material can be fastened to the cushion material by: connecting (e.g. sewing) the first rim of the tape portion to the backside of the cover material; attaching an assist tool such as a clip and a hog ring to the block portion; and engaging the assist tool to the wire embedded in the cushion material.

At this time, the tape portion is flexible in a desired direction along the cover material by aligning the width direction of the tape portion in the thickness direction of the cover material. Though the block portion itself is hardly flexible, since the plurality of block portions are sequentially connected by the flexible joint portion, the block portions in totality are flexible in desired direction along the cover material in the same manner as the tape portion. On the other hand, since the joint portion is provided on the surface of the tape portion and extends along the surface of the tape portion, the joint portion is not easily flexed in the width direction of the tape portion, thereby providing a predetermined rigidity by adjusting the joint portion.

Accordingly, while the cover material fastening cord is flexible in the desired direction along the cover material, the cover material fastening cord is not easily flexed in a top/bottom direction of the cover material, so that the cover material fastening cord is applicable to a sharp curve design and is capable of avoiding an influence on the cover material.

In the above arrangement, it is preferable that an inclined surface is provided on a side wall of each of the block portions that faces adjacent one of the block portions, the inclined surface being inclined in a longitudinal direction of the tape portion in a manner tapered in a direction away from the tape portion.

According to the above arrangement, an interference between the block portions located inside when the cover material fastening cord is flexed in the thickness direction of the tape portion can be avoided, thereby rendering the cover material fastening cord to be applicable to a sharper curve.

In the above arrangement, it is preferable that a flexible support portion disposed along the block portions is further provided, the support portion being consecutive in the longitudinal direction of the tape portion and connected to each of the plurality of block portions.

With the additional support portion, the block portions can be sequentially connected not only by the joint portion but also by the support portion. The flexibility (in the direction along the cover material) or inflexibility (in the thickness direction of the cover material) of the cover material fastening cord can be easily designed with the use of the rigidity of the support portion.

In the above arrangement, it is preferable that the block portions, the joint portion and the support portion are integrally molded by a synthetic resin material.

According to the above arrangement, the production process can be simplified and consecutiveness of each of the components can be ensured.

In the above arrangement, it is preferable that each of the joint portion and the support portion is provided by a sheet-shaped component formed along the surface of the tape portion, and the joint portion and the support portion have the same thicknesses and are consecutive with each other.

According to the above arrangement, since the joint portion and the support portion sequentially connecting the block portions are provided by the consecutive sheet-shaped component, the joint portion and the support portion can be easily integrally molded by a synthetic resin material and the appearance of the joint portion and the support portion can be improved due to the simplified configuration.

It should be noted that, though the block portions, the joint portion and the support portion may be integrally molded by a synthetic resin material in the above arrangement as described above, the joint portion and the support portion may be molded in a sheet-shaped component and the block portions may be sequentially molded on the surface of the sheet-shaped component. In other words, the production process of the cover material fastening cord of the invention is not limited to specific procedures.

In the above arrangement, it is preferable that the first rim of the tape portion is connected to the cover material and a second rim of the tape portion is connected to a clip, and a thickness of the block portions in a thickness direction of the tape portion is defined to be a thickness capable of being held by the clip.

According to the above arrangement, the cover material can be efficiently fastened to the cushion material in a simpler operation of: connecting (e.g. sewing) the first rim of the tape portion on the backside of the cover material; attaching a clip to the block portion; and engaging the clip to the wire embedded in the cushion material.

BRIEF DESCRIPTION OF DRAWING(S)

DESCRIPTION OF EMBODIMENT(S)

Exemplary embodiment(s) of the invention will be described below with reference to the attached drawings.

First Exemplary Embodiment

FIGS. 1 to 4 show a fastening cord 8 according to a first exemplary embodiment of a cover material fastening cord of the invention.

The fastening cord 8 is used for placing a cover material on a surface of a cushion material of a vehicle seat.

Description of Fastening Structure of Cover Material

Figure 5:
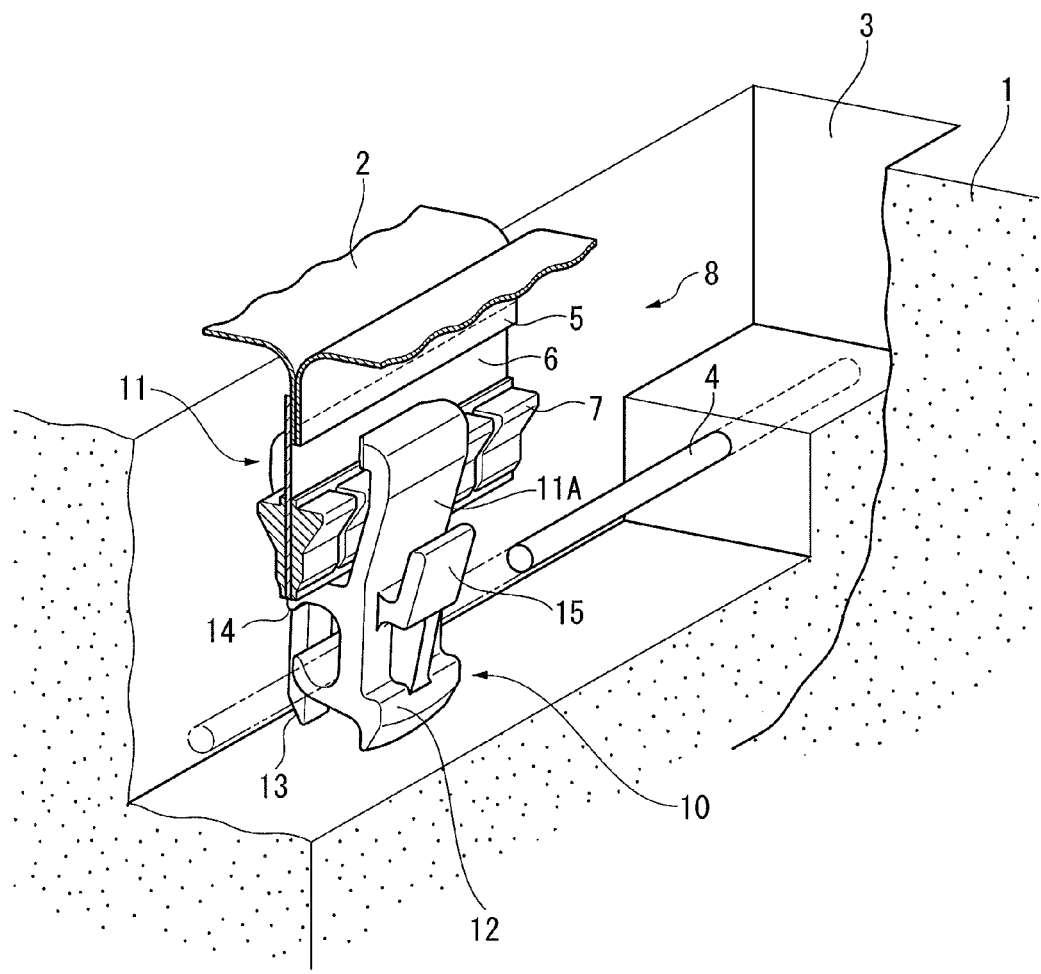
FIG. 5 is a partially sectioned perspective view showing a use condition of a fastening cord of the first exemplary embodiment.

FIG. 5 shows a use condition of the fastening cord 8 of the first exemplary embodiment.

A cushion material 1 for a vehicle seat is a synthetic resin foam material (e.g. polyurethane foam) molded into a shape of the seat. A groove 3 for fastening a cover material is formed in the cushion material 1. A wire 4 is disposed in the groove 3. The wire 4 is a metal wire member. The wire 4 can be installed in an insert method when the cushion material 1 is molded.

A cover material 2 is a synthetic resin fabric sheet and the like covering a surface of the cushion material 1. The cover material 2 includes a sewn portion 5 at a portion corresponding to the groove 3 of the cushion material 1. The sewn portion 5 is provided by folding a pair of sheet ends toward a backside thereof and sewing the sheet ends with a tape portion 6 of the fastening cord 8 being overlapped.

In the first exemplary embodiment, in order to fasten the cover material 2 to the cushion material 1, the fastening cord 8 at the backside of the cover material 2 is engaged with the wire 4 using a clip 10. In order to attach the clip 10, the fastening cord 8 is provided with block portions 7.

Description of Fastening Cord

Referring back to FIGS. 1 to 4, the fastening cord 8 includes the elongated tape portion 6 as one of basic components.

Figure 1:
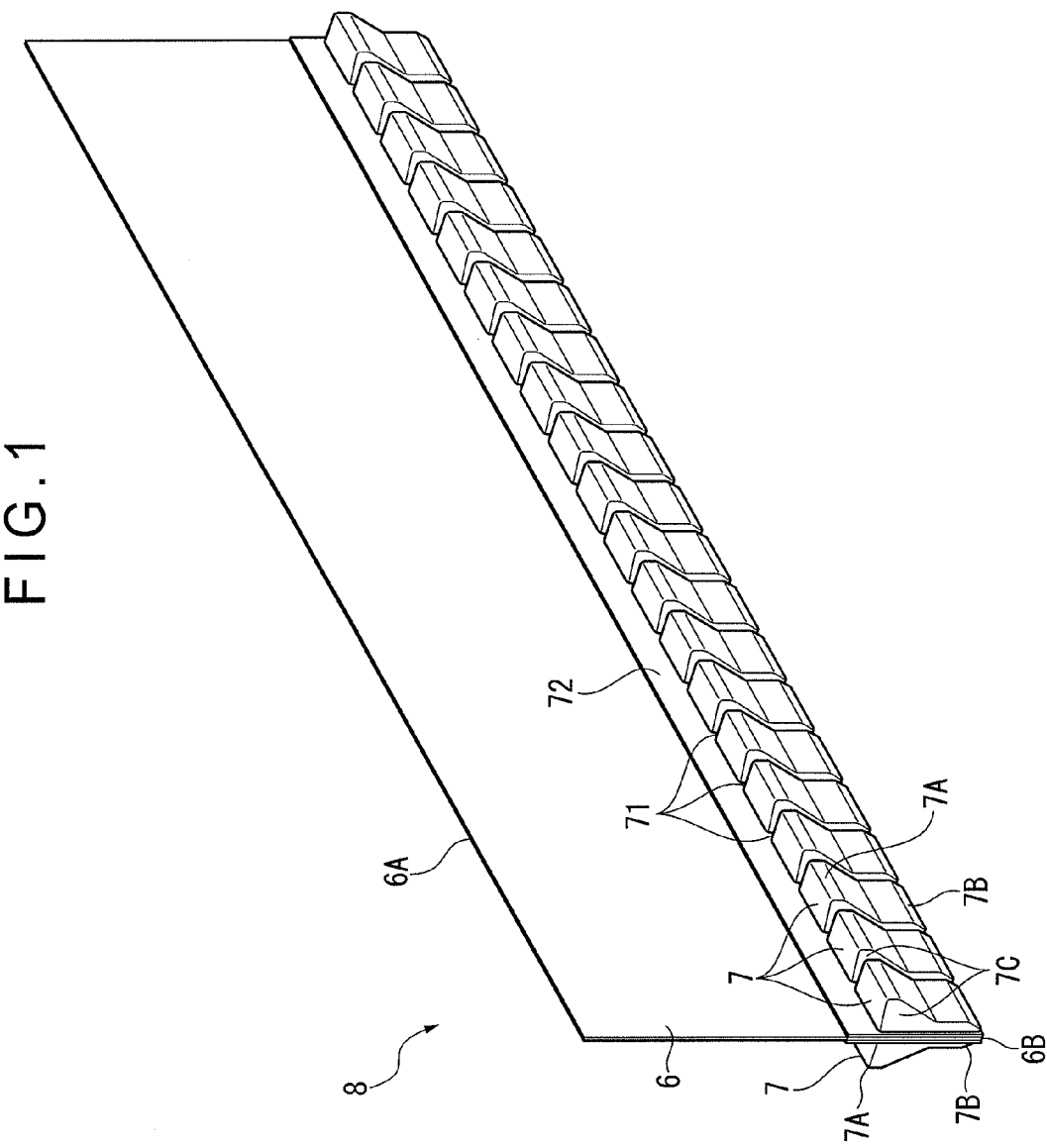
FIG. 1 is a perspective view showing a first exemplary embodiment of the invention.

A width direction of the tape portion 6 is defined to be a vertical direction in FIG. 1. One of the vertical ends of the tape portion 6 (a first rim 6A) is connected to the cover material 2 (see FIG. 5) and the other one of the vertical ends (a second rim 6B) is connected to the clip 10 (see FIG. 5). The tape portion 6 is connected to the cover material 2 so that the width direction of the tape portion 6 is aligned with the thickness direction of the cover material 2, where the tape portion 6 stands in the width direction relative to the backside of the cover material 2.

The material of the tape portion 6 is preferably strong enough for fastening the cover material 2 to the cushion material 1 and preferably capable of being sewn to the cover material 2. Usable examples of the material of the tape portion 6 are a tape-shaped component provided by weaving a synthetic resin fiber or a natural fiber, a cut product of the synthetic resin/natural fiber into a form of a tape, a tape-shaped molding product of a synthetic resin material, and a cut product of a synthetic resin film into a form of a tape.

Each of the block portions 7 (sometimes referred to as "the block portion" hereinafter) to which the clip 10 is attached is provided on the tape portion 6.

Figure 3:
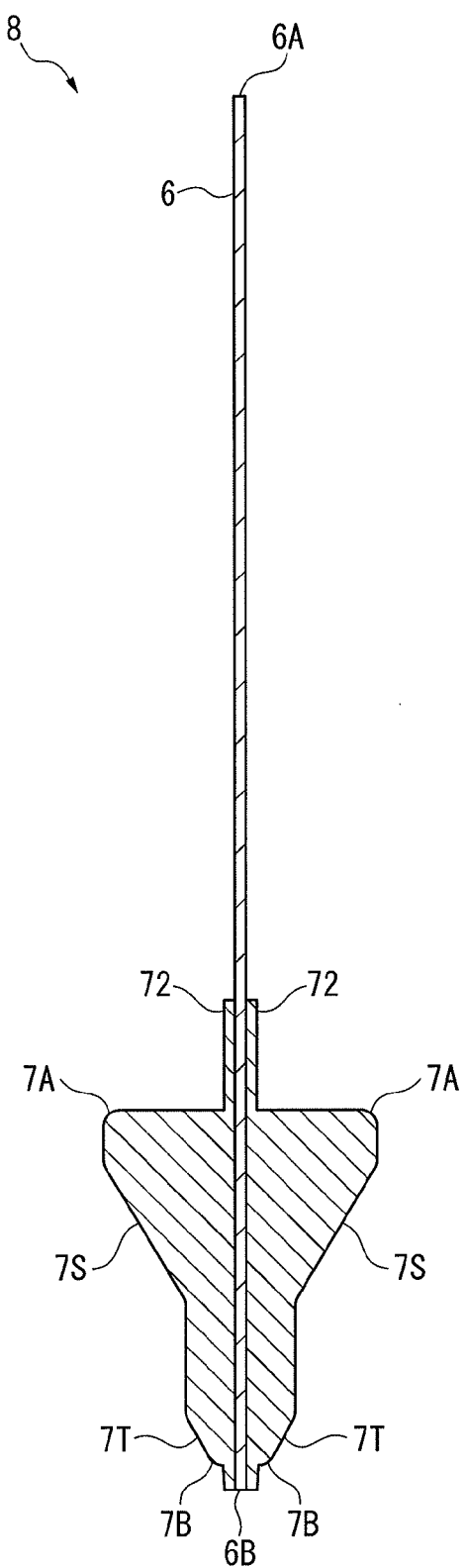
FIG. 3 is a cross sectional view showing a block portion of the first exemplary embodiment.
Figure 4:
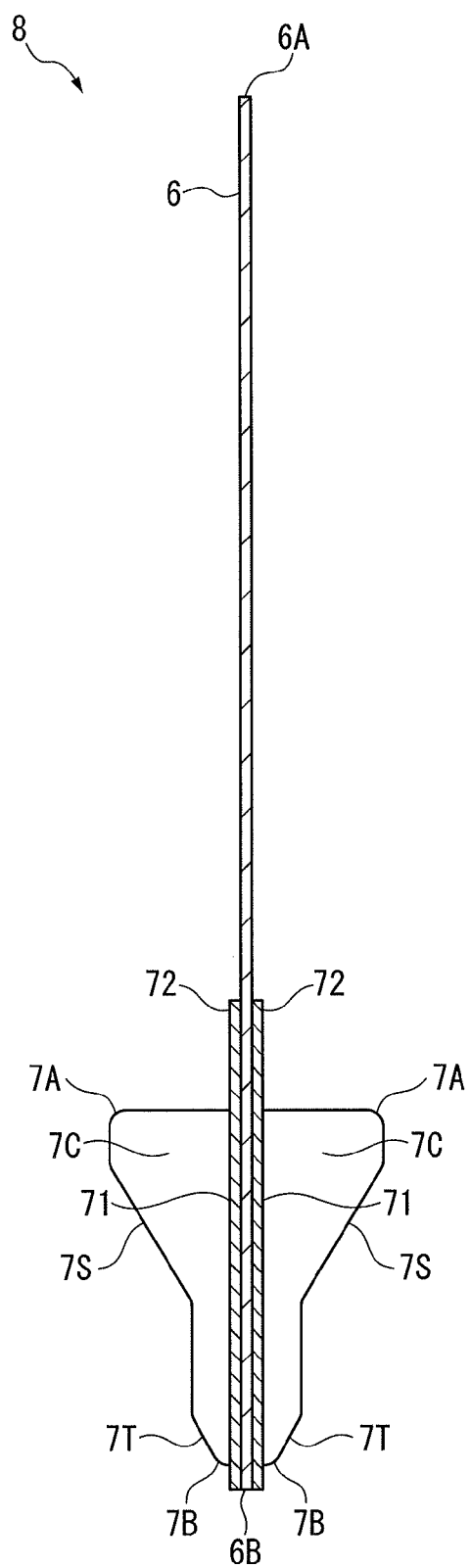
FIG. 4 is a cross sectional view showing a joint portion of the first exemplary embodiment.

As shown in FIGS. 3 and 4, the block portion 7 is a substantially Y-shaped synthetic resin component that projects on both sides of the second rim 6B of the tape portion 6.

In order to provide the block portion 7 on the surface of the tape portion 6, for instance, when a tape wound on a roller is unwound to be fed from the roller, a thermoplastic resin (e.g. polypropylene) is applied on the second rim 6B of the tape portion 6 by an insert molding.

The block portion 7 has a sufficient thickness in a thickness direction of the tape portion 6 at a base side 7A of the block portion 7 for being held by the clip 10.

Further, in order to facilitate insertion of the block portion 7 of the fastening cord 8 into the clip 10 when the fastening cord 8 is attached to the clip 10, the block portion 7 is provided in a substantially Y-shape with a distal side 7B of the block portion 7 being thinned. The block portion 7 has an inclined surface 7T near the distal side 7B and an inclined surface 7S extending from an intermediate portion to the base side 7A, so that the thickness of the cross section of the block portion 7 increases in two stages.

Figure 2:
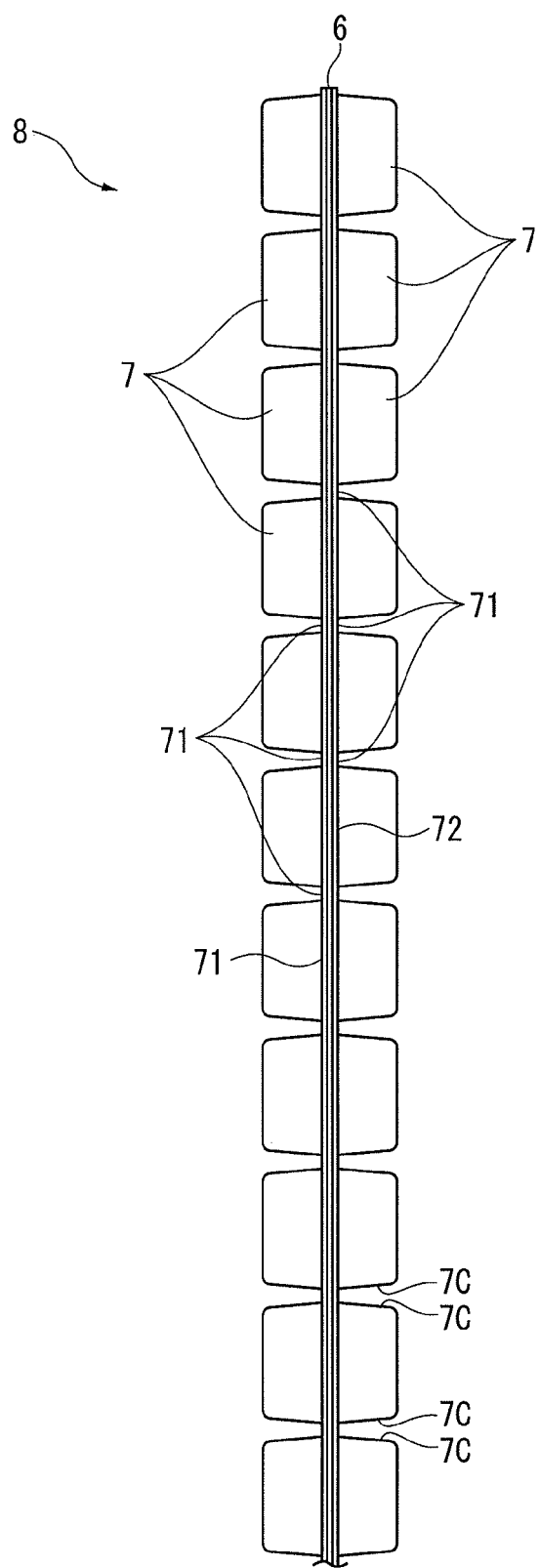
FIG. 2 is a plan view showing the first exemplary embodiment.

As shown in FIGS. 1 and 2, the block portions 7 protrude in a thickness direction of the tape portion 6 on both surfaces of the tape portion 6 near the second rim 6B (lower end in vertical direction of the tape portion 6 in FIG. 1), and the block portions 7 are arranged along a longitudinal direction of the tape portion 6 at a predetermined interval.

Each of the block portions 7 has a side wall 7C facing adjacent one of the block portions 7. The side wall 7C is defined in a form of an inclined surface inclined in a longitudinal direction of the tape portion 6 toward an inside of the block portion 7 as being remote from the tape portion 6, whereby each of the block portions 7 exhibits a so-called tapered shape in a plan view (see FIG. 2), where an end of each of the block portions 7 is thinner than the portion connected with the tape portion 6. With this arrangement, the space between opposing side walls 7C of the adjacent ones of the block portions 7 is defined such that both side walls 7C are separated from each other as being away from the tape portion 6 and the space is widened from the tape portion 6 toward an outermost surface of the block portion 7. When the tape portion 6 is flexed in a thickness direction thereof (i.e. when a part of the tape portion 6 is moved in a direction along the cover material 2 in FIG. 5), the tapered shape of each of the block portions 7 in a plan view (see FIG. 2) keeps the flexure of the tape portion 6 from being hindered due to a mutual interference between the block portions 7.

As shown in FIGS. 1 to 4, joint portions 71 for connecting adjacent ones of the block portions 7, and a support portion 72 that is consecutive in the longitudinal direction of the tape portion 6 and is sequentially connected to each of the block portions 7 are provided on the surface of the tape portion 6.

Each of the joint portions 71 (sometimes referred to as the "joint portion 71" hereinafter) is a thin sheet-shaped component provided along the surface of the tape portion 6 between adjacent ones of the block portions 7. Each of the joint portions 71 connects the block portions 7 on both sides thereof.

The support portion 72 is disposed in the longitudinal direction of the tape portion 6 along the base side 7A of the block portion 7 and is provided by a thin sheet-shaped component extending along the surface of the tape portion 6.

The support portion 72 is connected to each of the block portions 7 and each of the joint portions 71 between the block portions 7. The support portion 72 is provided in a predetermined width on the surface of the tape portion 6 from the base side 7A of the block portion 7 toward the first rim 6A of the tape portion 6.

The joint portion 71 and the support portion 72 are both thin sheet-shaped components provided along the surface of the tape portion 6 and are of the same thickness and consecutive with each other.

The block portion 7, the joint portion 71 and the support portion 72 are integrally molded by a synthetic resin material. Specifically, in a molding process in which the tape portion 6 is used as an insert, the block portion 7, the joint portion 71 and the support portion 72 on both sides of the tape portion 6 can be integrally molded.

In this integrally molded component, the portion intermittently formed between the block portions 7 defines the joint portion 71. Specifically, the joint portion 71 is defined by a section from the base side 7A of the block portion 7 to the distal side 7B in the width direction of the tape portion 6 (vertical direction in FIG. 1). On the other hand, the support portion 72 is defined by a portion not located between the block portions 7. Specifically, the support portion 72 is defined by a section extending from the base side 7A of each of the block portions 7 toward the first rim 6A of the tape portion 6 in the width direction of the tape portion 6 (vertical direction in FIG. 1). The support portion 72 is an elongated member consecutive in the longitudinal direction of the tape portion 6 along the block portion 7.

It should be noted that the block portion 7, the joint portion 71 and the support portion 72 may not be integrally molded by an insert molding, but may alternatively be provided by, initially forming the joint portion 71 and the support portion 72 as a sheet-shaped component on the surface of the tape portion 6 and subsequently forming the block portions 7 intermittently on the surface of the sheet-shaped component.

Examples of the synthetic resin material usable for the block portion 7, the joint portion 71 and the support portion 72 are polyethylene (PE), PVC (vinyl chloride), PS (polystyrene), PBT (polybutylene terephthalate). By adjusting the bending performance of the joint portion 71 and the support portion 72 with a selection of a material capable of obtaining suitable flexibility, the bending performance and rigidity of the fastening cord 8 including the tape portion 6 can be freely set.

It should be noted that the synthetic resin material preferably exhibits bending performance of about 1000 to 2000 MPa in terms of flexure modulus of elasticity.

Herein, the bending performance of the fastening cord 8 refers to the bending performance of the fastening cord 8 in the thickness direction of the tape portion 6, which is represented by a natural operation for, for instance, winding the tape. The rigidity of the fastening cord 8 refers to the bending performance of the fastening cord 8 in the width direction of the tape portion 6, which represented by an operation for bending the tape in the width direction.

When the fastening cord 8 is attached to the cover material 2, the tape portion 6 stands upright on the top and back sides of the cover material 2. In other words, the longitudinal direction and thickness direction of the tape portion 6 are aligned with an extension direction of the top and back sides of the cover material 2 and the width direction of the tape portion 6 becomes normal to the top and back sides of the cover material 2.

For such an application, in order to allow free designing of an installation pattern of the fastening cord 8 on the cover material 2, the fastening cord 8 preferably exhibits high bending performance in the thickness direction of the tape portion 6.

On the other hand, the fastening cord 8 preferably exhibits uniform fastening performance over the entire length of the fastening cord 8 in the longitudinal direction even when the fastening cord 8 intermittently fastens the cover material 2 to the cushion material 1 using clips 4. Accordingly, the fastening cord 8 is preferably not easily bent in the longitudinal direction with the use of rigidity (inflexibility) of the tape portion 6 in the width direction.

As described above, it is required for the fastening cord 8 to freely set the bending performance and the rigidity by the tape portion 6.

When the cover material 2 is fastened to the cushion material 1 using the fastening cord 8 according to the first exemplary embodiment, the tape portion 6 of the fastening cord 8 is sewn to the sewn portion 5 on the backside of the cover material 2, the clips 10 are attached to the fastening cord 8 and the clips 10 are engaged with the wire 4.

Description of Clip

Figure 6:
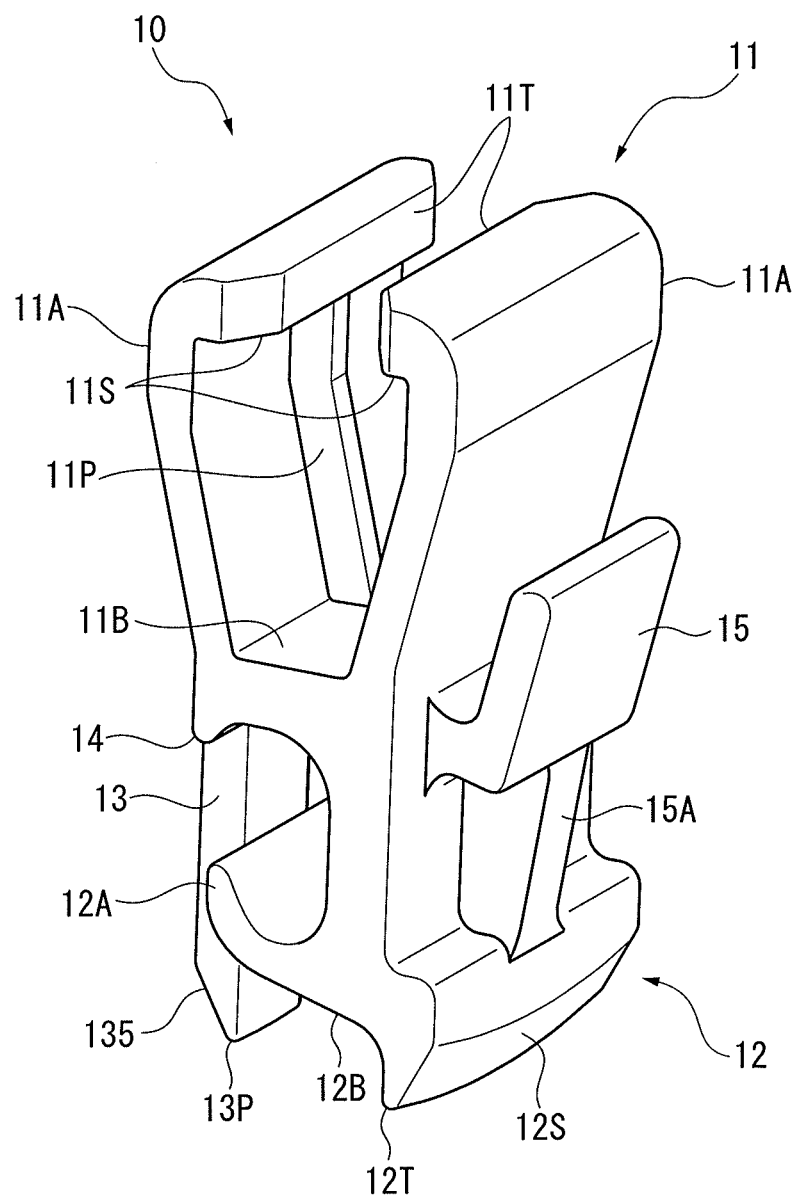
FIG. 6 is a perspective view showing a clip to be used in the first exemplary embodiment.
Figure 7:
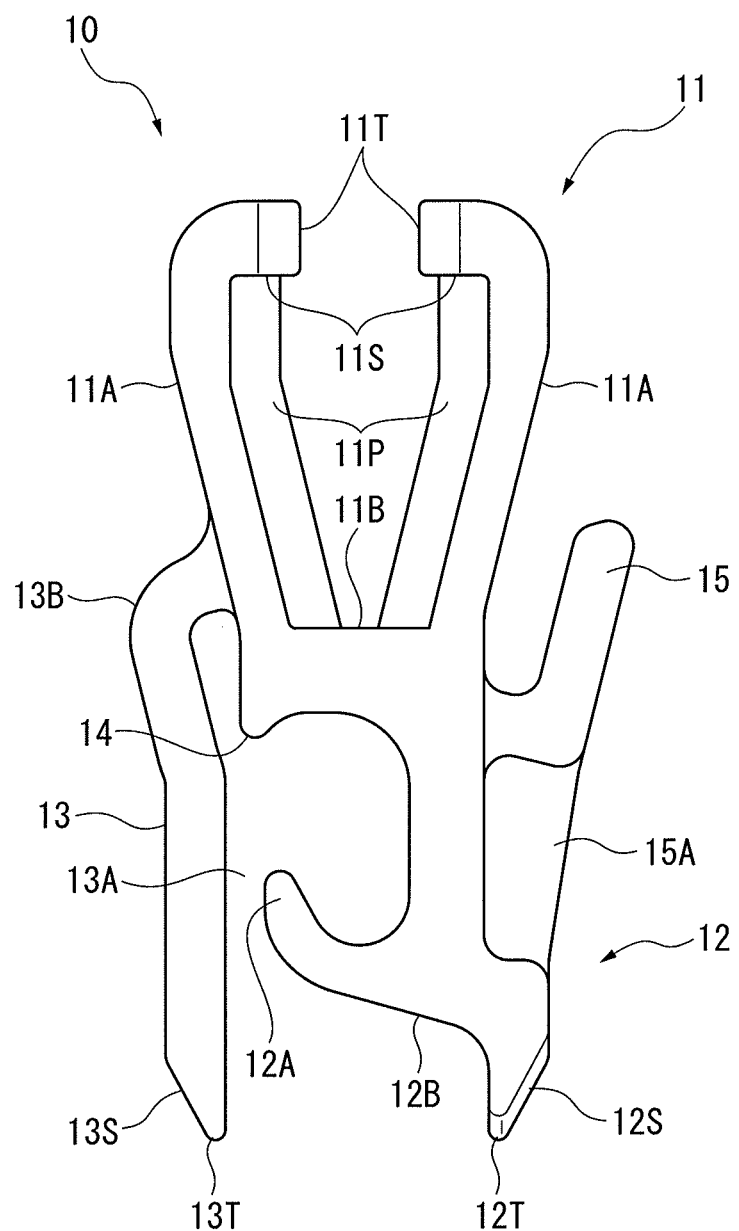
FIG. 7 is a front elevation showing the clip to be used in the first exemplary embodiment.

As shown in FIGS. 6 and 7, each of the clips 10 (sometimes referred to as "the clip 10" hereinafter) includes a chuck 11 that holds the block portion 7 for attaching the clip 10 to the fastening cord 8, a hook 12 with which the wire 4 is engaged, and a guide lever 13 that faces an opening side of the hook 12.

The chuck 11 includes a pair of engaging claws 11A. A base end of each of the engaging claws 11A is fixed to each of both sides of a chuck base 11B. The engaging claws 11A extend upward while being gradually separating from each other. Distal ends 11T of the engaging claws 11A are bent inward (i.e. in a direction facing with each other). Each of the distal ends 11T includes a locking surface 11S facing the chuck base 11B. The locking surface 11S is provided by a surface parallel to the chuck base 11B (i.e. equidistant from the chuck base 11B).

The chuck 11 accepts insertion of the tape portion 6 of the fastening cord 8 through between the pair of distal ends 11T, and engages the block portion 7 of the fastening cord 8 by each of the locking surfaces 11S, whereby the chuck 11 is engageable with the fastening cord 8.

The chuck 11 includes a stopper 11P provided by a rib extending from the chuck base 11B to the locking surface 11S on each of inner sides of the opposing engaging claws 11A.

With the chuck 11, when the clip 10 is attached to the fastening cord 8 (see FIG. 9), the block portions 7 on both sides of the tape portion 6 are housed inside the pair of engaging claws 11A and each of the base sides 7A is engaged with each of the locking surfaces 11S.

A base end of the hook 12 is connected to a bottom side (i.e. a side opposite to the cover material 2) of the chuck base 11B.

The hook 12 has a claw portion 12A with which the wire 4 is engaged. An outer circumferential surface 12B of the hook 12 is slanted toward the guide lever 13 from an inner side of a distal end 12T of the hook 12 as the outer circumferential surface 12B approaches the chuck 11. Thus, the wire 4 introduced into a space between the distal ends 12T and 13T of the hook 12 and the guide lever 13 (i.e. a clearance C1 in FIG. 10) is brought into contact with the outer circumferential surface 12B to be guided toward the guide lever 13.

After the wire 4 is guided toward the guide lever 13 by the outer circumferential surface 12B, the wire 4 is introduced to an inner space defined by the claw portion 12A through a gap 13A between the guide lever 13 and the claw portion 12A. Though the diameter of the wire 4 is larger than a normal width of the gap 13A, elastic deformations of the hook 12 and the guide lever 13 enlarge the gap (a clearance C2 in FIG. 11), thereby allowing the wire 4 to pass through the gap 13A.

The guide lever 13 is connected to an intermediate portion of a side wall of the chuck 11, more specifically, to an intermediate portion of the engaging claw 11A. A curved portion 13B is provided at a part of the guide lever 13.

The curved portion 13B further lengthens the guide lever 13, thereby increasing the flexibility of the guide lever 13 due to the elastic deformation.

A guide projection 14 projecting toward the guide lever 13 is provided to the bottom side of the chuck base 11B of the chuck 11.

Due to the presence of the curved portion 13B, the base end of the guide lever 13 extends from the intermediate portion of the chuck 11 with a predetermined clearance between the guide lever 13 and the chuck 11. Accordingly, a U-shaped recess is provided between the guide lever 13 and the chuck 11 and the wire 4 may erroneously enter the recess. However, since the guide projection 14 is provided to block the recess, the erroneous entering of the wire 4 can be avoided. Further, the wire 4 having passed through the above-described gap 13A can be smoothly introduced into the inner space of the claw portion 12A.

Inclined surfaces 12S and 13S are provided respectively on mutually opposite side walls of the respective distal ends 12T and 13T of the hook 12 and the guide lever 13, the inclined surfaces 12S and 13S approaching each other toward the distal ends.

Since the inclined surfaces 12S and 13S are provided, even when the hook 12 and the guide lever 13 stick into the bottom side of the groove 3 of the cushion material 1, the hook 12 and the guide lever 13 receive reaction forces in a direction to approach each other, so that unexpected opening of the hook 12 and the guide lever 13 and consequent disengagement of the wire 4 can be avoided.

A jig receiver 15 adapted to receive a flathead screwdriver T (a manipulation jig: see FIGS. 10 and 11) inserted from near the chuck 11 is provided on a side wall of the clip 10 near the hook 12 (on a part extending from the hook 12 to the chuck base 11B in the first exemplary embodiment).

The jig receiver 15 is provided by an L-shaped projection raised from the side wall of the chuck base 11B to be bent in an extending direction of the chuck 11. The jig receiver 15 includes a reinforcing rib 15A extending toward the distal side of the hook 12.

The screwdriver T (manipulation jig) is inserted into the jig receiver 15 from the side of the chuck 11 to apply a lateral force, thereby deforming the portion of the clip 10 near the hook 12 to enlarge the gap 13A between the hook 12 and the guide lever 13. At this time, since the rib 15A is provided, the lateral force is sufficiently transmitted to the hook 12.

Description of Fastening Operation of Cover Material

FIGS. 8 to 12 show an operation for fastening the cover material 2 using the fastening cord 8 according to the first exemplary embodiment.

Initially, the fastening cord 8 is sewn and fixed to the sewn portion 5 of the cover material 2. Then, the fastening cord 8 is bent along the wire 4 in the groove 3 of the cushion material 1.

Subsequently, a plurality of the clips 10 are attached to the fastening cord 8 in a manner spaced apart from each other.

Figure 8:
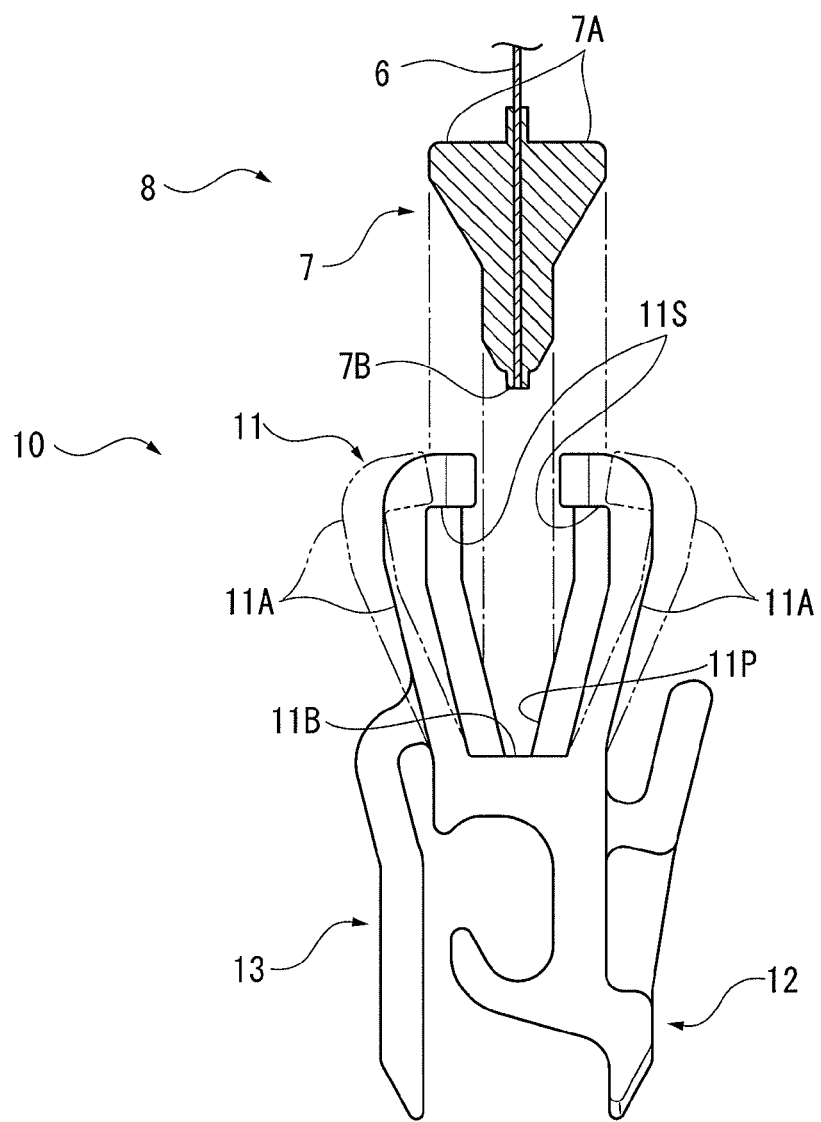
FIG. 8 shows a condition of the clip of the first exemplary embodiment before being attached.

When the clips 10 are attached to the fastening cord 8, as shown in FIG. 8, the block portion 7 of the fastening cord 8 is placed against the chuck 11 of the clip 10 and is strongly pressed to separate the pair of engaging claws 11A from each other, thereby press-fitting the block portion 7 into between the pair of distal ends 11T.

Figure 9:
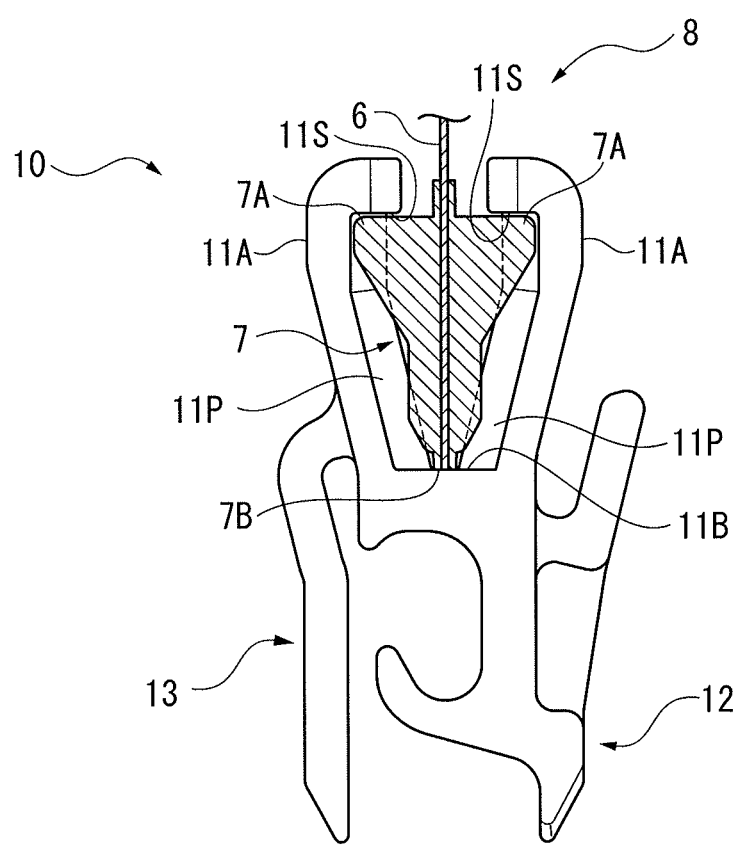
FIG. 9 shows a condition of the clip of the first exemplary embodiment after being attached.

With this operation, the block portion 7 is received between the pair of engaging claws 11A as shown in FIG. 9, where: the distal side 7B of the block portion 7 is brought into contact with the chuck base 11B; the base side 7A is engaged with the locking surface 11S; and each of the stoppers 11P is held in the clearance (the gap between opposing pairs of the side walls 7C) between the block portions 7 to keep the clip 10 at the current position of the fastening cord 8.

Each of the plurality of clips 10 is sequentially engaged with the fastening cord 8.

Figure 10:
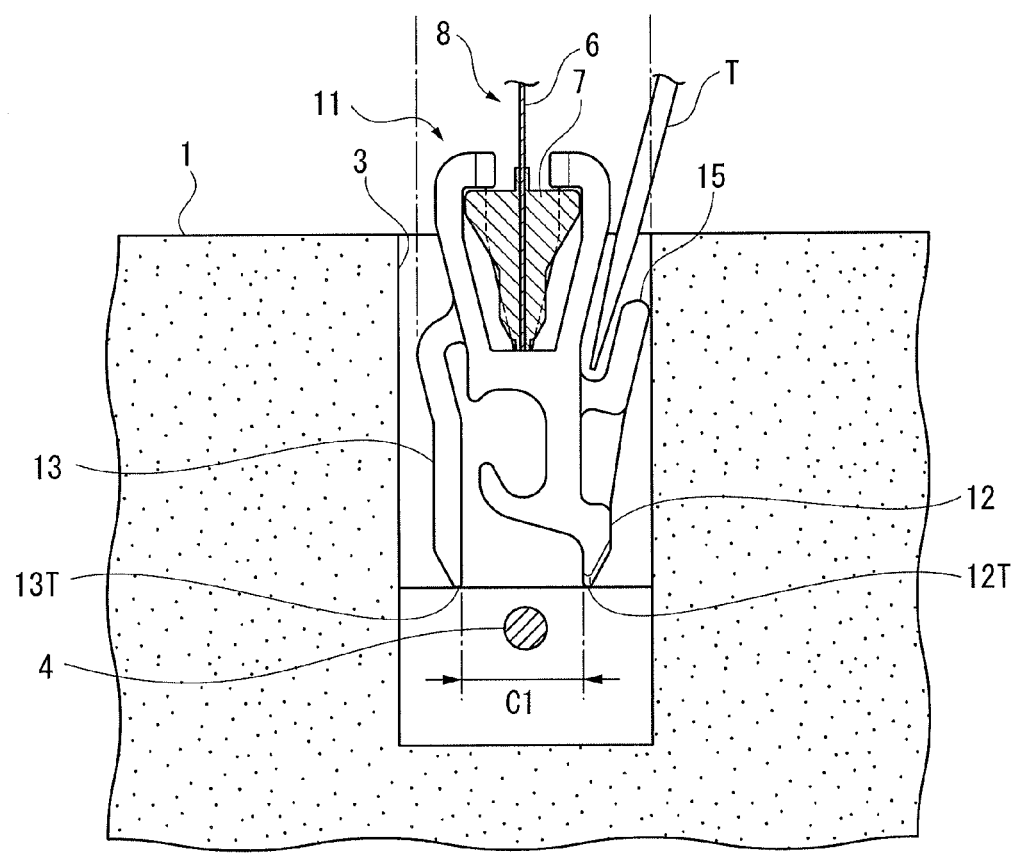
FIG. 10 shows the fastening cord of the first exemplary embodiment before being engaged with a wire.

Subsequently, as shown in FIG. 10, the fastening cord 8 attached with the clips 10 is introduced into the groove 3 of the cushion material 1 to sequentially bring the clips 10 into engagement with the wire 4.

At this time, the flathead screwdriver T (manipulation jig) is inserted into the jig receiver 15 of each of the clips 10 engaged with the fastening cord 8, and each of the clips 10 is introduced into the groove 3 together with the fastening cord 8 by the operation of the screwdriver T.

When the clips 10 are introduced into the groove 3, the wire 4 set at the bottom of the groove 3 enters between the hook 12 and the guide lever 13.

Since the clearance C1 between the distal end 12T of the hook 12 and the distal end 13T of the guide lever 13 is sufficiently larger than the diameter of the wire 4, by bringing the clip 10 closer to the wire 4, the wire 4 automatically enters the clearance C1 between the hook 12 and the guide lever 13.

Figure 11:
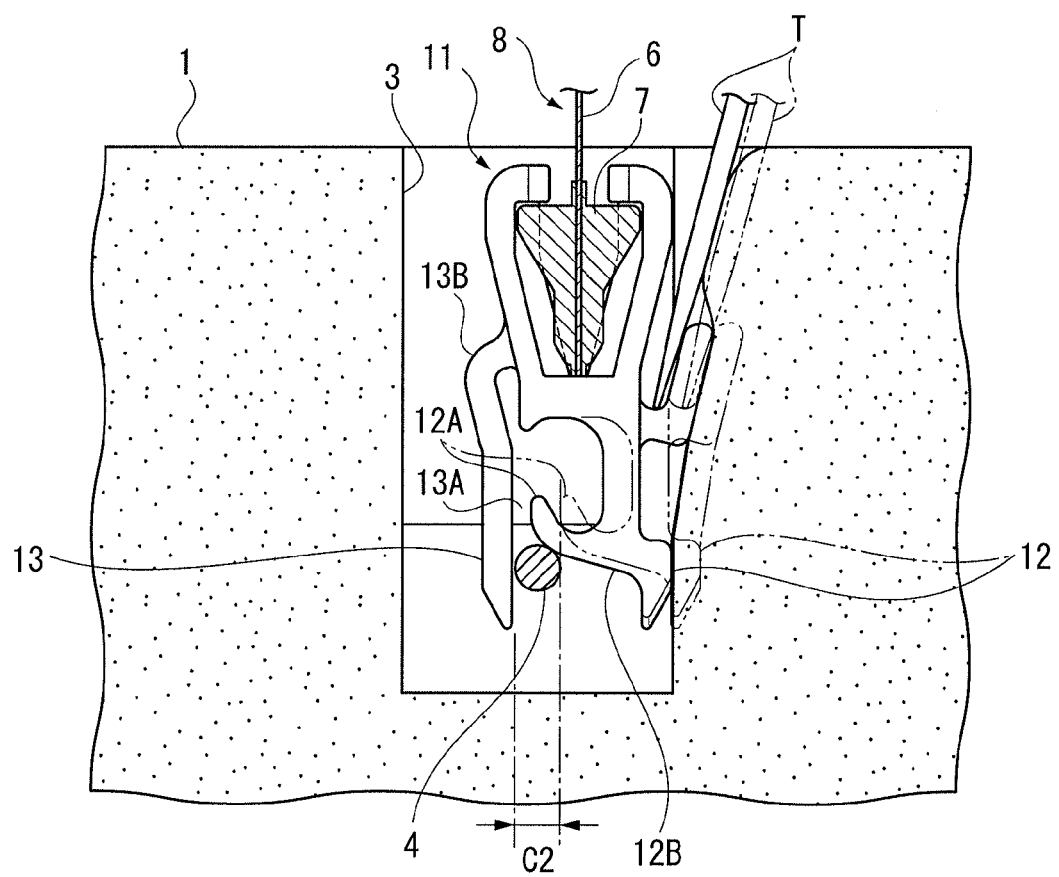
FIG. 11 shows the fastening cord of the first exemplary embodiment while being engaged with the wire.

As shown in FIG. 11, as the clip 10 further advances, the wire 4 introduced into between the hook 12 and the guide lever 13 is brought into contact with the outer circumferential surface 12B and is guided toward the guide lever 13 in accordance with the inclination of the outer circumferential surface 12B to be in contact with an inner side face of the guide lever 13.

The gap 13A between the claw portion 12A of the hook 12 and the inner side face of the guide lever 13 is smaller than the diameter of the wire 4. Therefore, the wire 4 cannot directly pass through the gap 13A. This arrangement is for preventing the engaged wire 4 from being disengaged after the wire 4 is engaged.

In this state, the screwdriver T operated for introducing the clip 10 (downward in FIG. 6) is moved away from the guide lever 13 (rightward in FIG. 6). With this operation, the clip 10 moves in totality in the direction of the screwdriver T while deforming the inner surface of the groove 3 (the cushion material 1) (see two-dot chain line in FIG. 6).

While the hook 12 is deformed, the guide lever 13 is in contact with the wire 4 to be restricted from movement. As a result, the guide lever 13 is elastically deformed to be separated from the hook 12 (especially the claw portion 12A) and the gap 13A between the claw portion 12A and the guide lever 13 is enlarged. When the gap 13A is enlarged to provide the clearance C2 larger than the diameter of the wire 4, the wire 4 can pass through the gap 13A.

In the first exemplary embodiment, since the guide lever 13 is connected to the side wall of the chuck 11, the length of the guide lever 13 can be made greater than the distance from the bottom surface of the chuck 11 to the distal end 13T of the guide lever 13 (i.e. the distance to the distal end of the clip 10). Accordingly, even with the same material and the same cross sectional shape, the guide lever 13 is easily elastically deformed, so that the wire 4 can easily pass through the gap.

Further, the curved portion 13B provided at a part of the guide lever 13 also increases the substantive length of the guide lever 13, thereby assisting the flexure of the guide lever 13 and, consequently, passage of the wire 4.

It should be noted that, the guide lever 13 can be flexed in a direction separating from the hook 12 by the wire 4 guided from the outer circumferential surface 12B to the claw portion 12A when the clip 10 is thrust against the wire 4 without using the screwdriver T. The wire 4 can also pass through the gap 13A by the forced operation.

Figure 12:
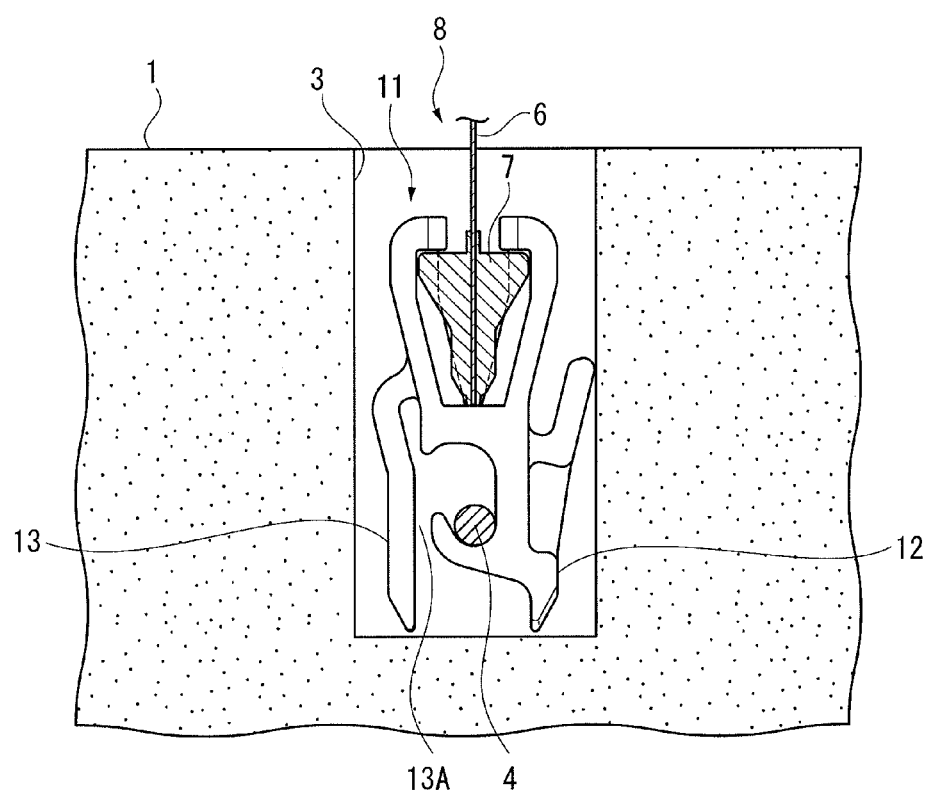
FIG. 12 shows the fastening cord of the first exemplary embodiment after being engaged with the wire.

As shown in FIG. 12, the wire 4 having passed through the gap 13A is received in the inner space of the hook 12. When a tension from the fastening cord 8 is applied, the wire 4 is brought into close contact with an arc-shaped inner circumference of the claw portion 12A to generate a reaction force. Thus, the fastening cord 8 and the wire 4 are fastened and the cover material 2 can be consequently fastened to the cushion material 1 (see FIG. 5).

Effects of First Exemplary Embodiment

The above-described first exemplary embodiment provides the following effects.

The first rim 6A of the tape portion 6 is sewn to be connected to the backside of the cover material 2 and the clips 10 are attached to the block portion 7. Then, the clips 10 are engaged with the wire 4 embedded in the cushion material 1, whereby the cover material 2 can be fastened to the cushion material 1.

The width direction of the tape portion 6 is aligned with the thickness direction of the cover material 2, so that the tape portion 6 is flexible in desired direction along the cover material 2. Though the block portion 7 itself is not easily flexed, since the plurality of block portions 7 are sequentially connected via the flexible joint portions 71, the block portion 7 in totality is flexible in the desired direction along the cover material 2 in the same manner as the tape portion 6.

Since the joint portion 71 is provided on the surface of the tape portion 6 and extends along the surface of the tape portion 6, the joint portion 71 is not easily flexed in the width direction of the tape portion 6, so that a predetermined rigidity can be obtained by adjustment (adjustment of the material and dimension (e.g. thickness)) of the joint portion 71.

Accordingly, while the fastening cord 8 is flexible in the desired direction along the cover material 2, the fastening cord 8 is not easily flexed in a top-bottom direction of the cover material 2, whereby the fastening cord 8 is applicable to a sharp curved design and is adapted to avoid an influence on the cover material.

In the first exemplary embodiment, since the mutually opposing side walls 7C of adjacent ones of the block portions 7 are provided by inclined surfaces that are tapered toward an end surface of the block portions 7, the interference between the block portions 7 that are interiorly located when the fastening cord 8 is flexed in the thickness direction of the tape portion 6 can be avoided, thereby allowing the fastening cord 8 to be applicable to a shaper curve.

In the first exemplary embodiment, since the support portion 72 is added along the block portions 7, the block portions 7 are sequentially connected not only by the joint portion 71 but also by the support portion 72, so that the flexibility of the fastening cord 8 (in the direction along the cover material) and inflexibility (in the thickness direction of the cover material) can be easily determined using the rigidity of the support portion 72.

In the first exemplary embodiment, since the block portion 7, the joint portion 71 and the support portion 72 are integrally molded by the synthetic resin material, the manufacturing process can be simplified and consecutiveness of the components can be ensured.

In the first exemplary embodiment, since the joint portion 71 and the support portion 72 are provided by sheet-shaped components formed along the surface of the tape portion 6 and are consecutive with each other with the same thickness, the joint portion 71 and the support portion 72 for sequentially connecting the block portion 7 can be provided by the series of sheet-shaped components. Thus, the joint portion 71 and the support portion 72 can be further easily integrally molded together with the block portion 7, and the appearance of the components can be improved for the simplified configuration.

Second Exemplary Embodiment

Figure 13:
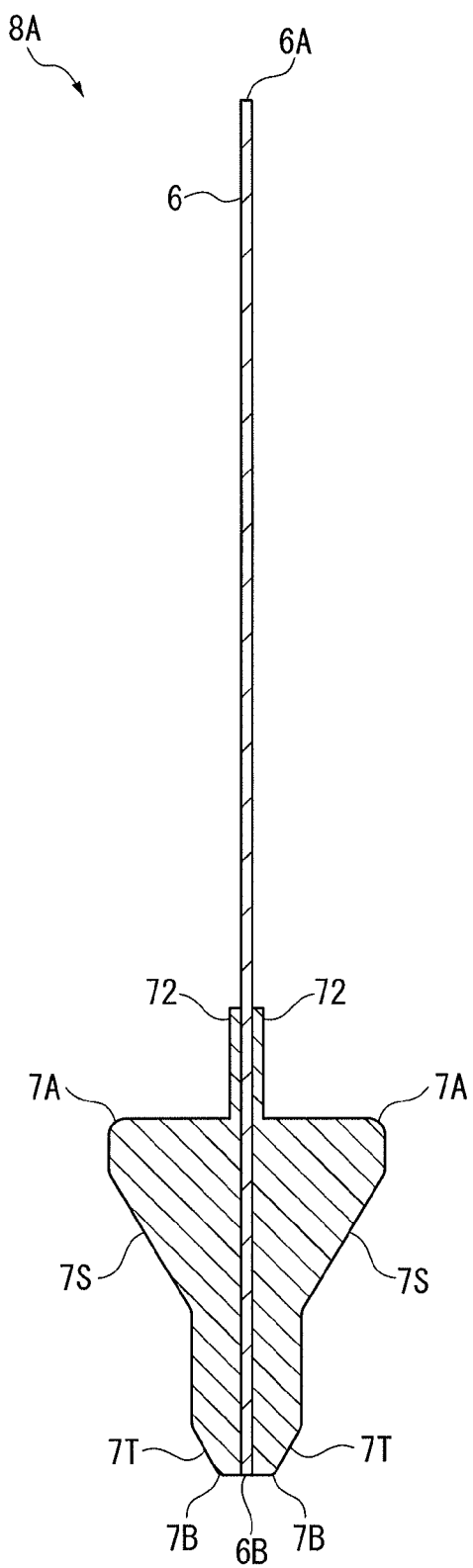
FIG. 13 is a cross sectional view showing a block portion according to a second exemplary embodiment of the invention.
Figure 14:
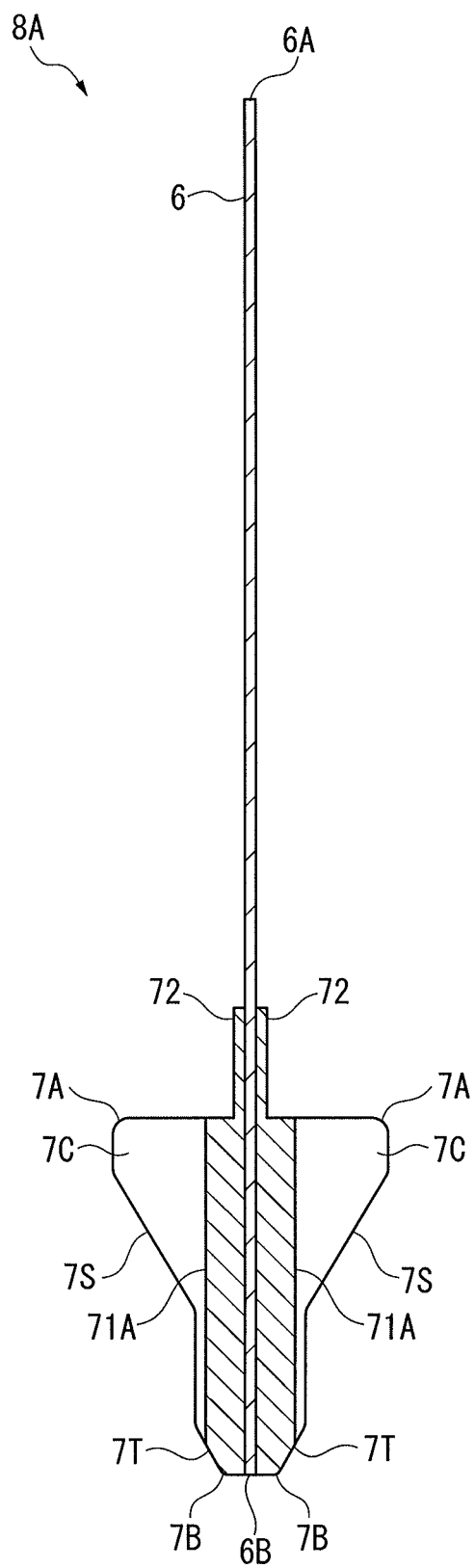
FIG. 14 is a cross sectional view showing a joint portion according to second exemplary embodiment.

FIGS. 13 and 14 show a fastening cord 8A according to a second exemplary embodiment of the cover material fastening cord of the invention.

The basic arrangement of the fastening cord 8A of the second exemplary embodiment and the procedure of the use thereof according to FIGS. 5 to 12 are the same as the fastening cord 8 according to the first exemplary embodiment.

Thus, duplicated description of the same arrangement as those in the first exemplary embodiment will be omitted and only the different part(s) will be described below.

FIGS. 13 and 14 show cross sections of the block portion 7 and the joint portion 71 of the fastening cord 8A according to the second exemplary embodiment. FIGS. 13 and 14 correspond to FIGS. 3 and 4 in the first exemplary embodiment.

As shown in FIG. 13, the fastening cord 8A according to the second exemplary embodiment also includes the tape portion 6 and the block portion 7 similar to those in the first exemplary embodiment. It should be noted that the second rim 6B of the tape portion 6 does not protrude beyond the distal end of the block portion 7.

As shown in FIG. 14, the fastening cord 8A according to the second exemplary embodiment also includes the joint portion 71 and the side wall 7C similar to those in the first exemplary embodiment. However, though the joint portion 71 in the first exemplary embodiment has the same thickness as the support portion 72, the joint portion 71 in the second embodiment is thicker than the support portion 72.

According to the second exemplary embodiment, the same effects as those in the above-described first exemplary embodiment can be obtained. In addition, since the joint portion 71A is thicker than the support portion 72, the bending performance of the fastening cord 8A can be altered, where the rigidity of the block portion 7 can be increased and the block portion 7 can be firmly fixed to the tape portion 6.

Third Exemplary Embodiment

Figure 15:
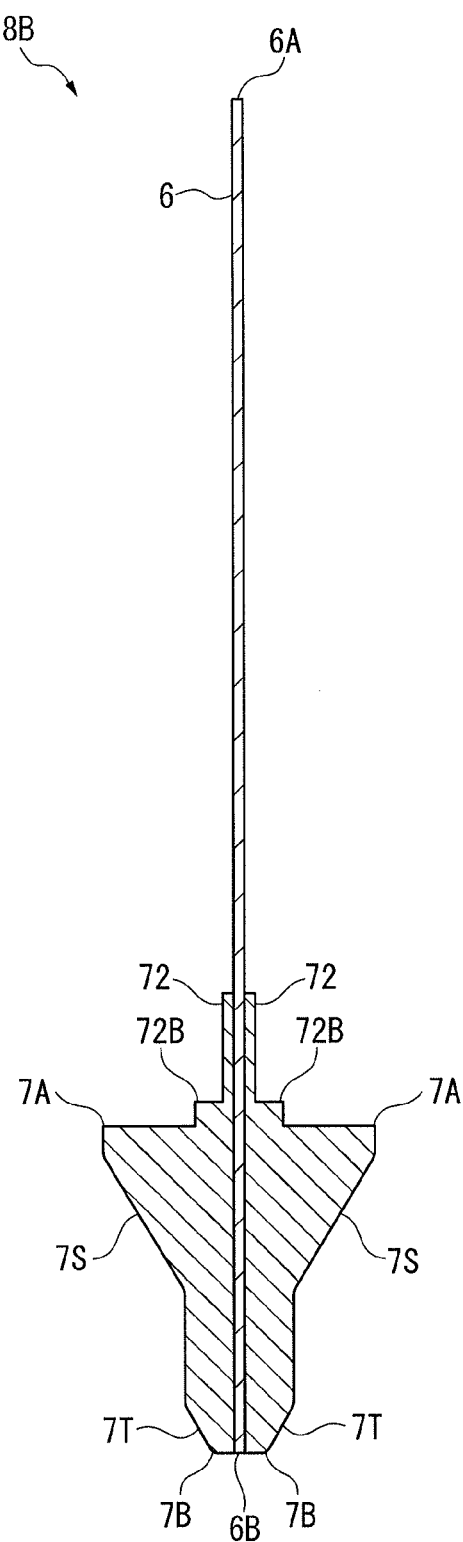
FIG. 15 is a cross sectional view showing a block portion of a fastening cord according to a third exemplary embodiment of the invention.
Figure 16:
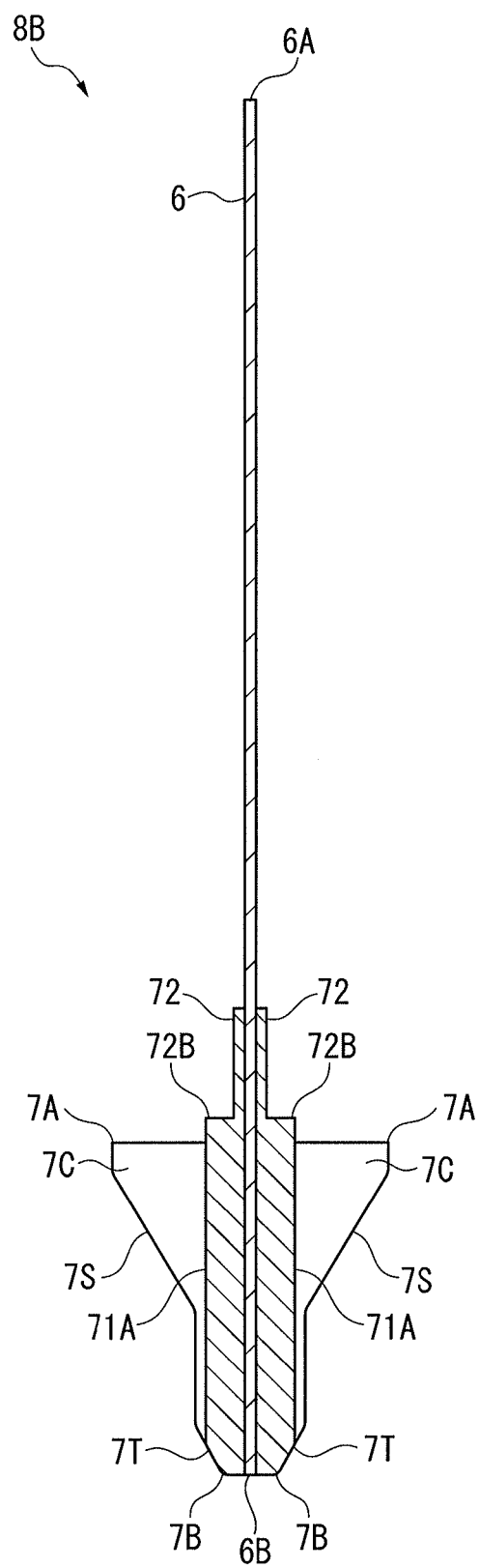
FIG. 16 is a cross sectional view showing a joint portion according to the third exemplary embodiment.

FIGS. 15 and 16 show a fastening cord 8B according to a third exemplary embodiment of the cover material fastening cord of the invention.

The fastening cord 8B according to the third exemplary embodiment is basically the same as the fastening cord 8 of the first exemplary embodiment except that the thick joint portion 71A as in the second exemplary embodiment is provided (see FIG. 15).

Additionally, in the third exemplary embodiment, a part of the support portion 72 is defined to be a thick portion 72B of a large thickness. The thick portion 72B has the same thickness as that of the joint portion 71A and is consecutive with the joint portion 71A. The thick portion 72B is not provided only at the portion at which the joint portion 71A is provided but also consecutively formed at the portion at which the block portion 7 is provided (see FIG. 16).

According to the third exemplary embodiment, the same effects as those in the above-described first exemplary embodiment can be obtained. In addition, since the joint portion 71A and the thick portion 72 of the support portion 72B are thick, the bending performance of the fastening cord 8B can be further altered, where the rigidity of the block portion 7 can be increased and the block portion 7 can be firmly fixed to the tape portion 6.

Fourth Exemplary Embodiment

Figure 17:
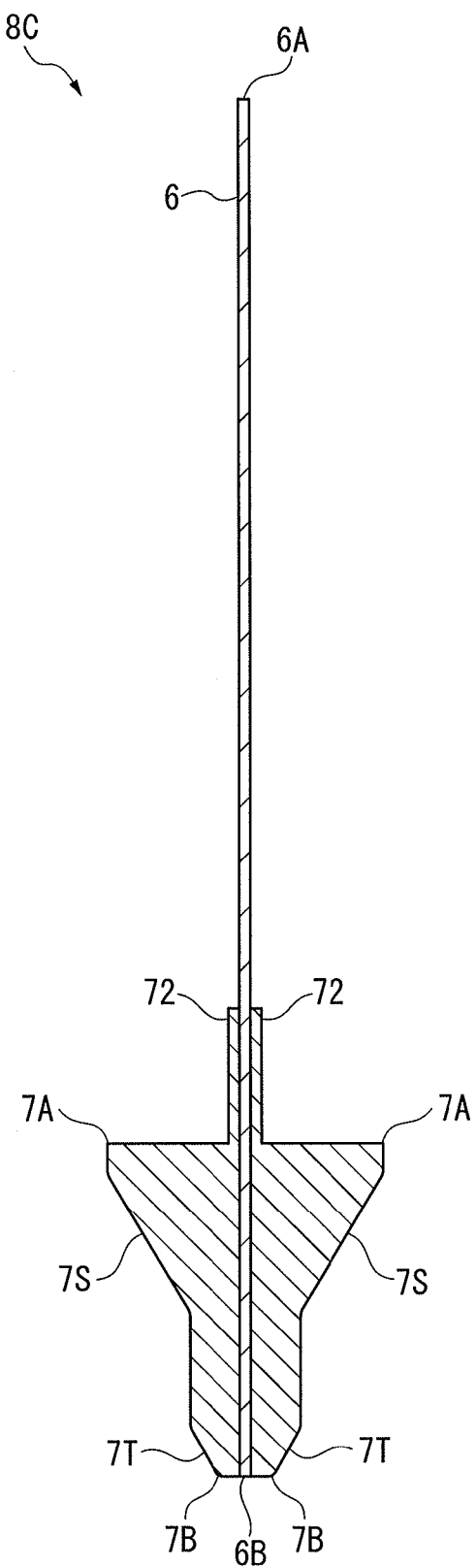
FIG. 17 is a cross sectional view showing a block portion according to a fourth exemplary embodiment of the invention.
Figure 18:
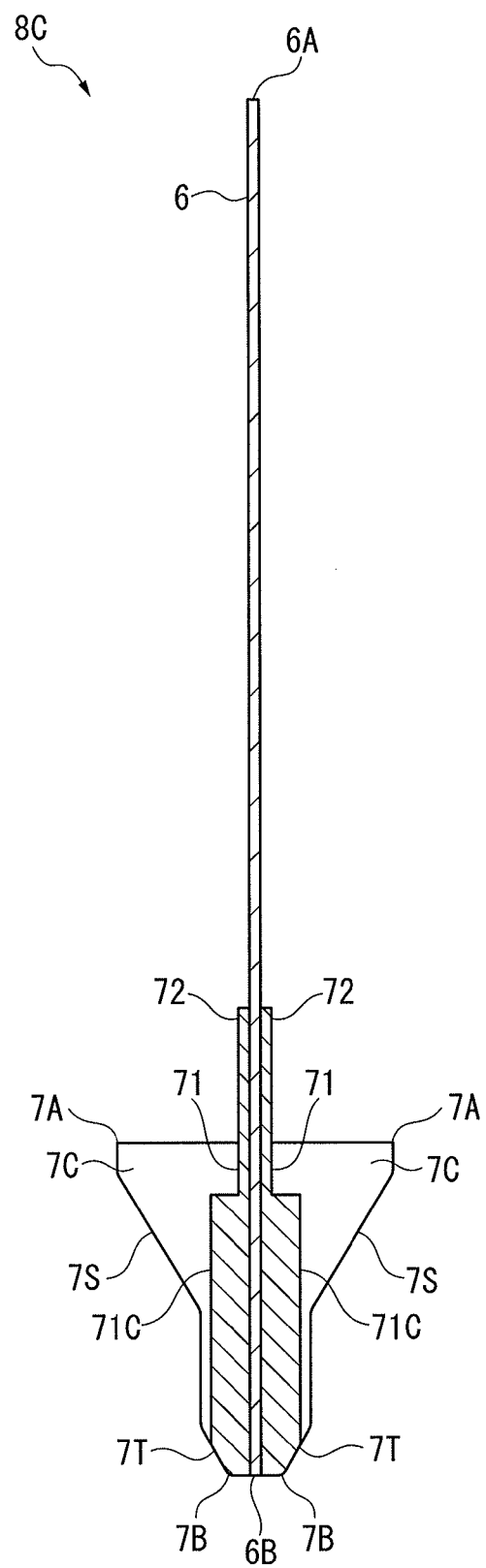
FIG. 18 is a cross sectional view showing a joint portion of the fourth exemplary embodiment.

FIGS. 17 and 18 show a fastening cord 8C according to a fourth exemplary embodiment of the cover material fastening cord of the invention.

The fastening cord 8C according to the fourth exemplary embodiment is basically the same as the fastening cord 8 of the first exemplary embodiment except that the thick joint portion 71C as in the second exemplary embodiment is provided (see FIG. 17).

However, in the fourth exemplary embodiment, the thick joint portion 71C is provided only at a portion close to the distal side 7B of the block portion 7, and the portion near the support portion 72 is defined by the joint portion 72 of the same thickness as that of the support portion 71 in the same manner as the first exemplary embodiment (see FIG. 18).

According to the fourth exemplary embodiment, the same effects as those in the above-described first exemplary embodiment can be obtained. In addition, since the size of the thick joint portion 71C is reduced as compared with the second exemplary embodiment, the tape portion 6 is more easily flexed.

Modification of Exemplary Embodiment(s)

It should be noted that the scope of the invention is not limited to the above-described exemplary embodiments, but the detailed shape and dimension of the components can be altered as desired in implementing the invention, where modification and the like in a range compatible with an object of the invention is encompassed by the scope of the invention.

For instance, though the block portion 7, the joint portion 71 and the support portion 72 may be integrally molded by the synthetic resin material as in the exemplary embodiments, the joint portion 71 and the support portion 72 may be molded in a sheet-shaped component on the surface of the tape portion 6 and a plurality of the block portions 7 may be sequentially formed on the surface of the sheet-shaped component.

The block portion 7, the joint portion 71 and the support portion 72 may be molded by, in addition to the insert molding described in the above exemplary embodiments, other process including performing a molding process using a molten resin on the surface of the tape portion 6 along the tape portion 6, and the production process of the cover material fastening cord according to the invention is not limited to specific procedures.

Though the support portion 72 is provided closer to the first rim 6A of the tape portion 6 (i.e. near the cover material 2) relative to the block portion 7, the support portion 72 may be provided closer to the second rim 6B (i.e. closer to the side from which the clip 10 is attached) relative to the block portion 7 or, may alternatively be provided on both of the sides of the block portion 7.

The joint portion 71 and the support portion 72 may be provided by sheet-shaped components of different thicknesses. Alternatively, the support portion 72 may be provided by a projection or a groove extending in a consecutive direction of the tape portion 6 and isolated from the joint portion 71.

Though the joint portion 71 and the support portion 72 in the above exemplary embodiments are provided by the sheet-shaped components of a certain thickness on the surface of the tape portion 6, a part of the sheet-shaped components may be provided with a stepped thin portion or recess, through which the tape portion 6 may be visible. Alternatively, an opening may be provided at a part of the sheet-shaped component to expose the tape portion 6.

The block portion 7, the joint portion 71 and the support portion 72 are provided on the surface of the tape portion 6 in the above exemplary embodiments. In this instance, hole(s) penetrating in the thickness direction may be provided at a region of the tape portion 6 where the block portion 7, the joint portion 71 and the support portion 72 are provided, and the synthetic resin material for forming the block portion 7, the joint portion 71 and the support portion 72 may be supplied into the hole to firmly attach the block portion 7, the joint portion 71 and the support portion 72 to the tape portion 6 using the synthetic resin material.

Especially, when the block portion 7, the joint portion 71 and the support portion 72 are provided on both sides of the tape portion 6, the synthetic resin material supplied into the hole connects the block portion 7, the joint portion 71 and the support portion 72 on both sides of the tape portion 6 and holds the tape portion 6, thereby further strengthening the adhesion to the tape portion 6.

It should be noted that the support portion 72 may be omitted when the bending performance of the block portions 7 can be adjusted by the joint portion 71.

It is not requisite to define the side wall 7C of the block portion 7, which faces adjacent one of the block portions 7 as an inclined surface. When the clearance between adjacent ones of the block portions 7 are sufficiently large, since the interference between the block portions 7 during flexing does not occur, the side wall 7C may not necessarily be the inclined surface.

In the above exemplary embodiments, though the block portions 7 are provided on both sides of the tape portion 6 and a clearance is provided between the block portions 7 on both sides to ensure the bending performance of the tape portion 6, as shown, for instance, in FIG. 2, the clearance may be provided only on one side of the tape portion 6. When the clearance is provided between the block portions 7 on one side of the tape portion 6 and the block portions 7 on the opposite side are closely disposed (i.e. without clearance), it is fully possible that the tape portion 6 is flexed in the direction toward the side provided with the clearance.

In the exemplary embodiment, as shown in, for instance, FIG. 3 of the first exemplary embodiment, the thickness of the block portion 7 increases from the distal side 7B toward the base side 7A in two stages (i.e. at the inclined surface 7T at the distal side 7B and the inclined surface 7S at the base side 7A). However, the thickness may be monotonously inclined (i.e. exhibiting substantially isosceles triangle or wedge-shaped cross section) or, alternatively, increases in three or more stages with three or more inclined surfaces.

The tape portion 6 may be provided by a tape, a belt and the like provided by a synthetic resin fiber. The tape portion 6 may be made of unwoven fabric. However, when the tape portion 6 is made of a non-fibrous consecutive synthetic resin film and the like, material waste is likely to be generated when the tape portion 6 is sewn to the cover material 2.

The connection between the tape portion 6 and the cover material 2 is not limited to be made by sewing but may be made using other connection process such as welding and adhesion. In this instance, a synthetic resin film and the like may be safely used for the tape portion 6.

In the above-described exemplary embodiments, when the cover material 2 is fastened to the cushion material 1, the tape portion 6 of the fastening cord 8 of the invention is sewn to the sewn portion 5 at the backside of the cover material 2 and the clips 10 are attached to the fastening cord 8. The cover material 2 is engaged with the wire 4 set in the cushion material 1 via the clips 10.

However, the fastening cord 8 of the invention may be fastened to the cushion material 1 with other arrangement.

Figure 19:
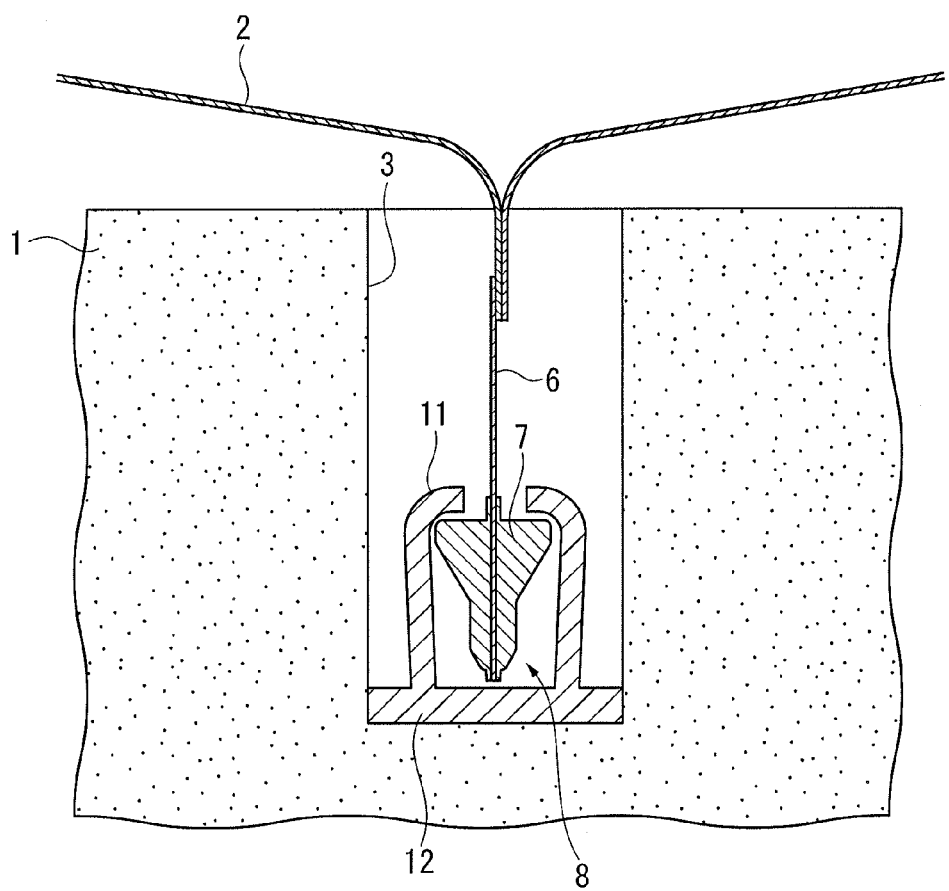
FIG. 19 is a cross section showing a fifth exemplary embodiment of the invention.

FIG. 19 shows a fifth exemplary embodiment of the invention.

In the fifth exemplary embodiment, the cushion material 1, the cover material 2, and the fastening cord 8 including the tape portion 6 and the block portion 7 of the invention are the same as those in the first exemplary embodiment or the other exemplary embodiments. Thus, duplicated description will be omitted herein.

In the fifth exemplary embodiment, the wire 4 is not provided in the cushion material 1 but a hook 12 having a chuck 11 are disposed in the cushion material 1. The hook 12 is molded in the groove 3 of the cushion material 1 when the cushion material 1 is molded. The hook 12 includes a portion consecutive along the bottom side of the groove 3 and the chuck 11 intermittently provided on the consecutive portion at a predetermined interval. The chuck 11 is similar to the chuck 11 provided to each of the clips 10 in the above-described first and other exemplary embodiments and are adapted to engage with the block portions 7 of the fastening cord 8.

The fifth exemplary embodiment offers effects similar to those in the above-described first and other exemplary embodiments.

Figure 20:
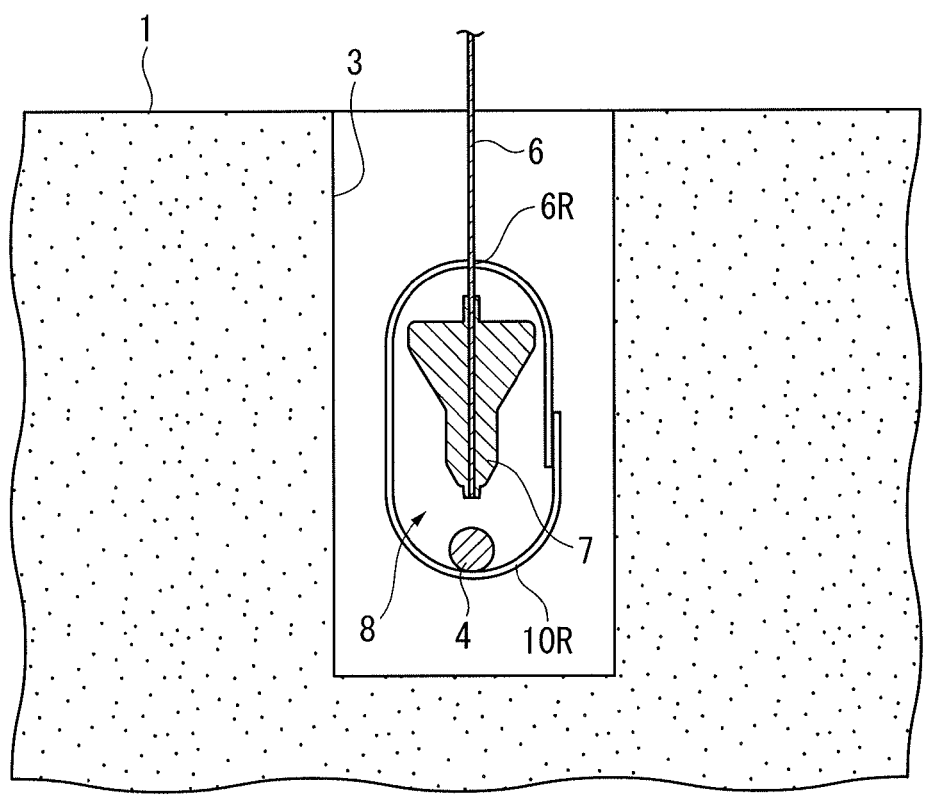
FIG. 20 is a cross sectional view showing a sixth exemplary embodiment of the invention.

FIG. 20 shows a sixth exemplary embodiment of the invention.

In the sixth exemplary embodiment, the cushion material 1, the cover material 2, the wire 4 disposed in the groove 3, and the fastening cord 8 including the tape portion 6 and the block portion 7 of the invention are the same as those in the first and the other exemplary embodiments. Thus, duplicated description will be omitted herein.

In the sixth exemplary embodiment, when the wire 4 disposed in the groove 3 of the cushion material 1 and the fastening cord 8 are engaged, existing hog rings are used in place of the clips 10 in the first exemplary embodiment.

A plurality of insertion holes 6R are provided in the tape portion 6 of the fastening cord 8 at a predetermined interval. A hog ring 10R is inserted into each of the insertion holes 6R. Each of the hog rings 10R is engaged with the wire 4. The hog rings 10R fasten the fastening cord 8 to the cushion material 1.

Since the fastening cord 8 of the invention includes the tape portion 6, the fastening cord 8 can be used for fastening using existing hog rings.

The invention claimed is:

1. A cover material fastening cord comprising:
   an elongated tape portion;
   a plurality of block portions that are provided along a surface of the tape portion and project in a thickness direction of the tape portion from the surface of the tape portion;
   a plurality of flexible joint portions provided on the surface of the tape portion between the block portions, each of the joint portions connecting adjacent ones of the block portions, each of the joint portions being defined by a sheet-shaped member extending from a base side to a distal side of each of the block portions on the surface of the tape portion; and
   a flexible support portion disposed along the block portions, the support portion being continuous in a longitudinal direction of the tape portion and connected to each of the block portions, the support portion being defined by a sheet-shaped member extending from the base sides of the block portions in a width direction of the tape portion along the surface of the tape portion,
   wherein the block portions, the joint portions and the support portion are integrally molded from a synthetic resin material.

2. The cover material fastening cord according to claim 1, wherein
   an inclined surface is provided on side walls of each of the block portions, the inclined surface being inclined in a longitudinal direction of the tape portion away from the adjacent one of the block portions.

3. The cover material fastening cord according to claim 1, wherein
   the joint portions and the support portion have the same thicknesses and are continuous with each other.

4. The cover material fastening cord according to claim 1, wherein
   a second rim of the tape portion is connected to a clip, and
   a thickness of the block portions in the thickness direction of the tape portion is defined to be a thickness capable of being held by the clip.

5. The cover material fastening cord according to claim 1, wherein each of the joint portions connects the adjacent ones of the block portions from a base side to a distal side of each of the block portions in a width direction of the tape portion.

* * * * *